No. 705,701. Patented July 29, 1902.
G. B. PETSCHE.
CAM MECHANISM.
(Application filed July 31, 1897.)
(No Model.)
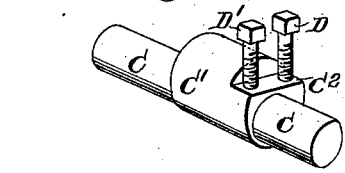
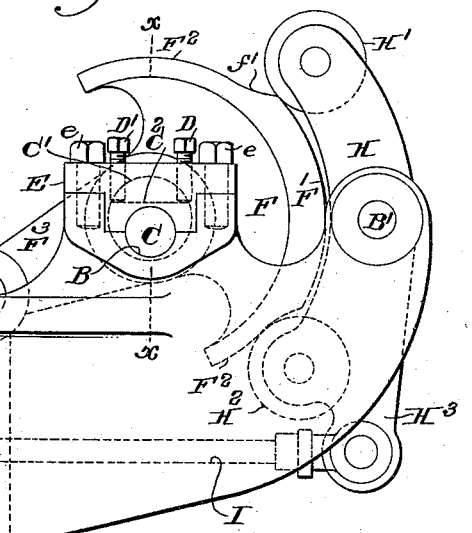
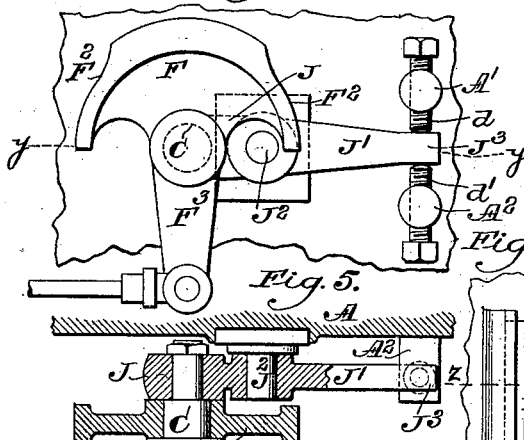
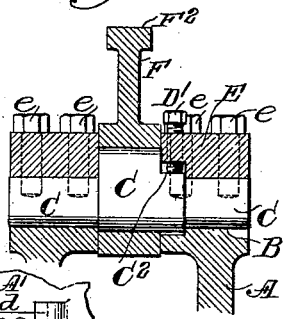
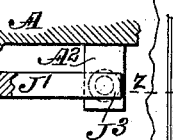
Witnesses. Inventor.
Gustav B. Petsche
his Attorney.

UNITED STATES PATENT OFFICE.

GUSTAV BERNHARD PETSCHE, OF PHILADELPHIA, PENNSYLVANIA, ASSIGNOR TO THE SOUTHWARK FOUNDRY & MACHINE COMPANY, OF PHILADELPHIA, PENNSYLVANIA, A CORPORATION OF PENNSYLVANIA.

CAM MECHANISM.

SPECIFICATION forming part of Letters Patent No. 705,701, dated July 29, 1902.

Application filed July 31, 1897. Serial No. 646,632. (No model.)

*To all whom it may concern:*

Be it known that I, GUSTAV BERNHARD PETSCHE, a subject of the Emperor of Germany, residing in the city and county of Philadelphia, in the State of Pennsylvania, have invented a certain new and useful Improvement in Cam Mechanism, of which the following is a true and exact description, reference being had to the accompanying drawings, which form a part thereof.

My invention relates to cam mechanism for transmitting motion or power, and has for its object to provide a mechanism of this description by which a quick change of motion can be effected and by which also a practically positive connection is secured between the parts moving and moved by the cam.

I have in practice used my new mechanism for actuating the valves of pumps, but it is obviously capable of very extended use.

The nature of my improvements will be best understood as described in connection with the drawings in which they are illustrated, and in which—

Figure 1 is a side elevation of my cam mechanism illustrated as I have used it in connection with steam-valve-actuating mechanism. Fig. 2 is a cross-section on the line $x\,x$ of Fig. 1; Fig. 3, a perspective view of the eccentric bearing, which I prefer to use for the cam; Fig. 4, a side elevation; Fig. 5, a section on the line $y\,y$ of Fig. 4, illustrating a modification of the adjusting mechanism; Fig. 6, a side elevation; and Fig. 7, a sectional view on the line $z\,z$ of Fig. 6, illustrating another modification of the cam-adjusting mechanism.

A indicates the framing to which the different parts illustrated in the drawings are secured, B being a bearing in the said frame for the cam-pivot, and B' a bearing also in the said frame for the rock-lever pivot.

C is the bearing-pin for the cam. Preferably I form it with an eccentric portion C', upon which the cam is pivoted, flattening off a portion, as indicated at $C^2$, to facilitate the adjustment of the eccentric. The pivot-pin is placed in the bearing B and secured in place, as shown, by the box E, which is fastened to the framing by means of the bolts $e$.

D and D' are adjusting-screws extending through the top of the box E where it extends over the flattened portion $C^2$ of the pivot-pin, and it will readily be seen that by an adjustment of the screws D and D' the pivot and its attached cam can be adjusted so as to throw the cam upward toward or downward away from the bearing B' of the rock-lever.

F is the cam, which turns upon the pivot-pin C, preferably, as stated, upon the eccentric portion thereof, and as shown and as I have generally employed it is given an oscillating movement—for instance, by means of a connecting-rod G, attached to an arm $F^3$ of the cam. The acting face of the cam consists of an elevated segmental portion F' and two depressed segmental surfaces $F^2\,F^2$, which are both segments of the same cylindrical surface, the elevated and depressed cam-faces being connected by inclines $f'\,f'$, which should be symmetrical and of an inclination which will maintain the contact of the cam-rollers, to be hereinafter described, as they pass from the upper to the lower and from lower to the upper cam-faces.

H is a rock-lever pivoted on a pin resting in the bearing B' and having symmetrical arms of equal length extending out on each side of its pivot and upon or to which are attached the equidistant cam-contacting faces, preferably cam-rollers, as indicated at H' $H^2$. The distance between these rollers is such that except in the intermediate position, when both of them rest upon the inclines $f'$ of the cam, the one roller will always rest upon the upper segmental surface and the other upon the lower segmental surface of the cam, and both of them in passing from the upper to the lower or the lower to the upper surfaces will at all times maintain contact with the cam-face. The motion imparted to the rock-lever H by the cam F is in turn transmitted from the rock-lever to the mechanism to be moved by any convenient attachment. As shown, an arm $H^3$ of the rock-lever is connected with a rod I, which may extend to a valve or other device to be moved.

The nice adjustment which is desirable with my mechanism can be secured by any relative adjustment of the pivots of the cam and rock-lever with respect to each other. It will be found most convenient as a rule to adjust the cam, and I have further shown my preferred adjusting device—namely, the eccentric pivot $C'$—as connected with the cam. Any other convenient adjusting device may, however, be used with good results. Thus in Figs. 4 and 5 I have shown the pivot C of the cam as attached to an arm J of a rock-lever J J', pivoted to the frame A at $J^2$ and adjusted by means of screws $d$ and $d'$, engaging with projecting studs $A'$ and $A^2$. Again, in Figs. 6 and 7 I have shown the pivot-pin C as secured to a head K adjustably in guides secured to the frame either by means of slots $K'$ and clamping-bolts $d^2$ or by means of adjusting-screws $d$ and $d'$ engaging with studs $A'$ and $A^2$, as shown in Fig. 4, and for greater security both of these devices for clamping the slot K in position may be used together, as indicated in the figures referred to.

It will be obvious that by the mechanism above described a quick outward and inward motion can be communicated by the cam through the rock-lever to any device to be actuated and that at the same time the connection can be made as positive as though the connection were by pivoted links instead of cams and contacting surfaces.

Having now described my invention, what I claim as new, and desire to secure by Letters Patent, is—

1. Cam mechanism consisting of a pivoted cam having a segmental elevated face $F'$ connected by symmetrical inclines $f'$ at each end with depressed segmental faces $F^2$ in combination with a rock-lever as H having cam-contacting faces or rollers $H'$ $H^2$ arranged at equal distances from the pivotal center of the lever and at a distance apart which will maintain both rolls always in contact with the cam-face while permitting them to pass alternately from the elevated to the depressed or from the depressed to the elevated cam-faces and means for adjusting the cam and rock-lever pivots to and from each other to maintain a close fit between the cam-face and rollers.

2. Cam mechanism consisting of a pivoted cam having a segmental elevated face $F'$ connected by segmental inclines $f'$ at each end with depressed segmental faces $F^2$ in combination with a rock-lever as H having cam-contacting faces or rollers $H'$ $H^2$ arranged at equal distances from the pivotal center of the lever and at a distance apart which will maintain both rolls always in contact with the cam-face while permitting them to pass alternately from the elevated to the depressed or from the depressed to the elevated cam-faces and means for adjusting the cam-pivot to and from the pivot of the rock-lever to maintain a close fit between the cam-face and rollers.

3. Cam mechanism consisting of a pivoted cam having a segmental elevated face $F'$ connected by symmetrical inclines $f'$ at each end with depressed segmental faces $F^2$ in combination with a rock-lever as H having cam-contacting faces or rollers $H'$ $H^2$ arranged at equal distances from the pivotal center of the lever and at a distance apart which will maintain both rolls always in contact with the cam-face while by permitting them to pass alternately from the elevated to the depressed or from the depressed to the elevated cam-faces, an eccentric pivot-bearing for the cam and means for shifting said eccentric and clamping it in position to adjust the cam to the lever-rollers.

GUSTAV BERNHARD PETSCHE.

Witnesses:
 CHAS. F. MYERS,
 D. STEWART.